United States Patent
Suzuki et al.

(10) Patent No.: US 11,072,226 B2
(45) Date of Patent: Jul. 27, 2021

(54) VEHICLE SUN VISOR DEVICE

(71) Applicant: TOYOTA JIDOSHA KABUSHIKI KAISHA, Aichi-ken (JP)

(72) Inventors: Takahiro Suzuki, Toyota (JP); Yusuke Takei, Toyota (JP); Yuji Kariya, Nissin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 112 days.

(21) Appl. No.: 16/596,806

(22) Filed: Oct. 9, 2019

(65) Prior Publication Data

US 2020/0122556 A1    Apr. 23, 2020

(30) Foreign Application Priority Data

Oct. 22, 2018  (JP) .............................. JP2018-198491

(51) Int. Cl.
*B60J 3/02* (2006.01)

(52) U.S. Cl.
CPC ................... *B60J 3/0239* (2013.01)

(58) Field of Classification Search
CPC .............................. B60J 3/0239; B60J 3/0243
USPC ........................................... 296/97.8, 97.11
See application file for complete search history.

(56) References Cited

U.S. PATENT DOCUMENTS

| | | | |
|---|---|---|---|
| 4,989,910 A * | 2/1991 | Mersman | B60J 3/0208 296/97.12 |
| 7,077,454 B1 * | 7/2006 | Schambre | B60J 3/0208 296/214 |
| 2005/0236864 A1 * | 10/2005 | Asai | B60J 3/02 296/97.8 |

FOREIGN PATENT DOCUMENTS

| | | |
|---|---|---|
| JP | 2016-130075 A | 7/2016 |
| JP | 2017-7448 A | 1/2017 |

* cited by examiner

*Primary Examiner* — Joseph D. Pape
(74) *Attorney, Agent, or Firm* — Hauptman Ham, LLP

(57) ABSTRACT

A vehicle sun visor device includes a base (a support), a sliding base (a sliding body), a visor body, and a torque hinge (a hinge) configured to connect the visor body to the sliding base in a rotatable manner in the up-down direction. The torque hinge includes a connecting member to which the visor body is connected. The connecting member includes a hole portion and a first fastening member (a first connecting portion). The visor body includes a projecting portion. The projecting portion is set to have a strength with which the projecting portion does not break even when an operation load to rotate the visor body around a hinge shaft is applied to the visor body, but the projecting portion breaks when a deployment load of an airbag is applied to the visor body.

2 Claims, 8 Drawing Sheets

VEHICLE SUN VISOR DEVICE

INCORPORATION BY REFERENCE

The disclosure of Japanese Patent Application No. 2018-198491 filed on Oct. 22, 2018 including the specification, drawings and abstract is incorporated herein by reference in its entirety.

BACKGROUND

1. Technical Field

The disclosure relates to a vehicle sun visor device.

2. Description of Related Art

In the related art, a sun visor attached to a ceiling of an automobile is mainly configured such that the sun visor is used by being rotated forward in the automobile front-rear direction manually by an occupant from a storing state along the ceiling with a ceiling attachment portion being taken as a rotating axis, and then, the sun visor is returned to the position along the ceiling by being rotated rearward in the automobile front-rear direction manually by the occupant similarly to the above. Such a sun visor is being exposed on the ceiling of the automobile, and therefore, appearance improvement has been desired for a long time so that the sun visor has a clear appearance. Meanwhile, a specification in which an automobile sun visor is storable inside a ceiling has been devised as a specification of the vehicle sun visor. For example, there has been known such a configuration that a sun visor stored inside a ceiling is slid forward in the automobile front-rear direction and rotated downward with a rear attachment portion of the sun visor being taken as a rotation axis so as to establish a usage state in which the sun visor keeps off the sunlight to protect eyes from light from outside (for example, Japanese Unexamined Patent Application Publication No. 2016-130075 (JP 2016-130075 A)). Further, as such a slide structure, there has been known such a configuration that a sun visor has an electrically sliding structure (for example, Japanese Unexamined Patent Application Publication No. 2017-007448 (JP 2017-007448 A)). With such configurations, the sun visor can be stored inside the ceiling, so that the ceiling of the automobile looks clean, and thus, the configurations contribute to the appearance improvement.

SUMMARY

However, it is conceivable that, when the position of the sun visor in the usage state is placed in a deployment area of a front airbag of the automobile, the sun visor interferes with the deployment of the airbag. On that account, a device that does not prevent the deployment of the airbag is desired.

The disclosure has been accomplished in consideration of such a point, and an object of the disclosure is to provide a structure that does not prevent deployment of an airbag when the airbag deploys in a vehicle sun visor device that is storable inside a ceiling.

In order to achieve the object, a vehicle sun visor device includes a support, a sliding body, a visor body, and a hinge. The support is disposed in a housing space between a vehicle constituent component of a vehicle and a vehicle interior material disposed inside a vehicle cabin. The sliding body is supported reciprocatably relative to the support in the front-rear direction. The visor body is connected to the sliding body. The hinge is configured to connect the visor body to the sliding body in a rotatable manner in the up-down direction. The hinge includes a connecting member to which the visor body is connected, the hinge extending outwardly in the radial direction from a hinge shaft as a rotating center. The connecting member includes a first connecting portion configured to rotatably connect the visor body at a position placed outwardly in the radial direction from the hinge shaft. The visor body includes a projecting portion configured to maintain a rotation prevention state where the visor body does not rotate around the first connecting portion when a projecting shape projecting toward the connecting member engages with the connecting member. The projecting portion is set to have a strength with which the projecting portion does not break even when an operation load to rotate the visor body around the hinge shaft is applied to the visor body, but the projecting portion breaks when a deployment load of an airbag is applied to the visor body.

As one feature and advantage of the above configuration, the hinge includes the connecting member to which the visor body is connected, the connecting member extending outwardly in the radial direction from the hinge shaft as the rotating center. The connecting member includes the first connecting portion configured to rotatably connect the visor body at a position placed outwardly in the radial direction from the hinge shaft. The visor body includes the projecting portion configured to maintain the rotation prevention state where the visor body does not rotate around the first connecting portion when the projecting shape projecting toward the connecting member engages with the connecting member. The projecting portion is set to have a strength with which the projecting portion does not break even when the operation load to rotate the visor body around the hinge shaft is applied to the visor body, but the projecting portion breaks when the deployment load of the airbag is applied to the visor body. On this account, the visor body has a structure in which, when the deployment load of the airbag is applied to the visor body, the projecting portion breaks, so that the visor body further rotates around the first connecting portion. This allows the visor body to retreat when the airbag deploys. Hereby, it is possible to achieve a structure of the vehicle sun visor device that does not prevent deployment of the airbag at the time when the airbag deploys, without disturbing a normal use operation of the visor body.

In the vehicle sun visor device, the connecting member may include a notch groove provided at a position placed further outwardly from the first connecting portion in the radial direction from the hinge shaft, the notch groove being cut in a direction where the connecting member rotates around the hinge shaft. The connecting member may include a second connecting portion in which the visor body is connected to the connecting member via the notch groove.

As one feature and advantage of the above configuration, the second connecting portion in which the visor body is connected to the connecting member via the notch groove is provided at a position different from the first connecting portion. Hereby, the visor body can be connected to the connecting member in a two-point support manner by the first connecting portion and the second connecting portion. Further, the second connecting portion can be removed from the connecting member via the notch groove, thereby making it possible to achieve a structure in which the second connecting portion does not disturb the visor body when the projecting portion breaks and the visor body further rotates around the first connecting portion at the time when the deployment load of the airbag is applied to the visor body.

With the above aspect of the disclosure, it is possible to provide a structure that does not prevent deployment of an airbag when the airbag deploys in a vehicle sun visor device that is storable inside a ceiling.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

One embodiment to carry out the disclosure will be described below with reference to FIGS. 1 to 8. Note that an automobile sun visor device applied to an automobile will be described as an embodiment of a vehicle sun visor device of the disclosure. Note that directional properties of up, down, right, and left in each figure are collectively shown as directions of up, down, right, and left viewed from a sitting person sitting in an automobile.

Overall Configuration of Automobile Sun Visor Device

Figure 1:
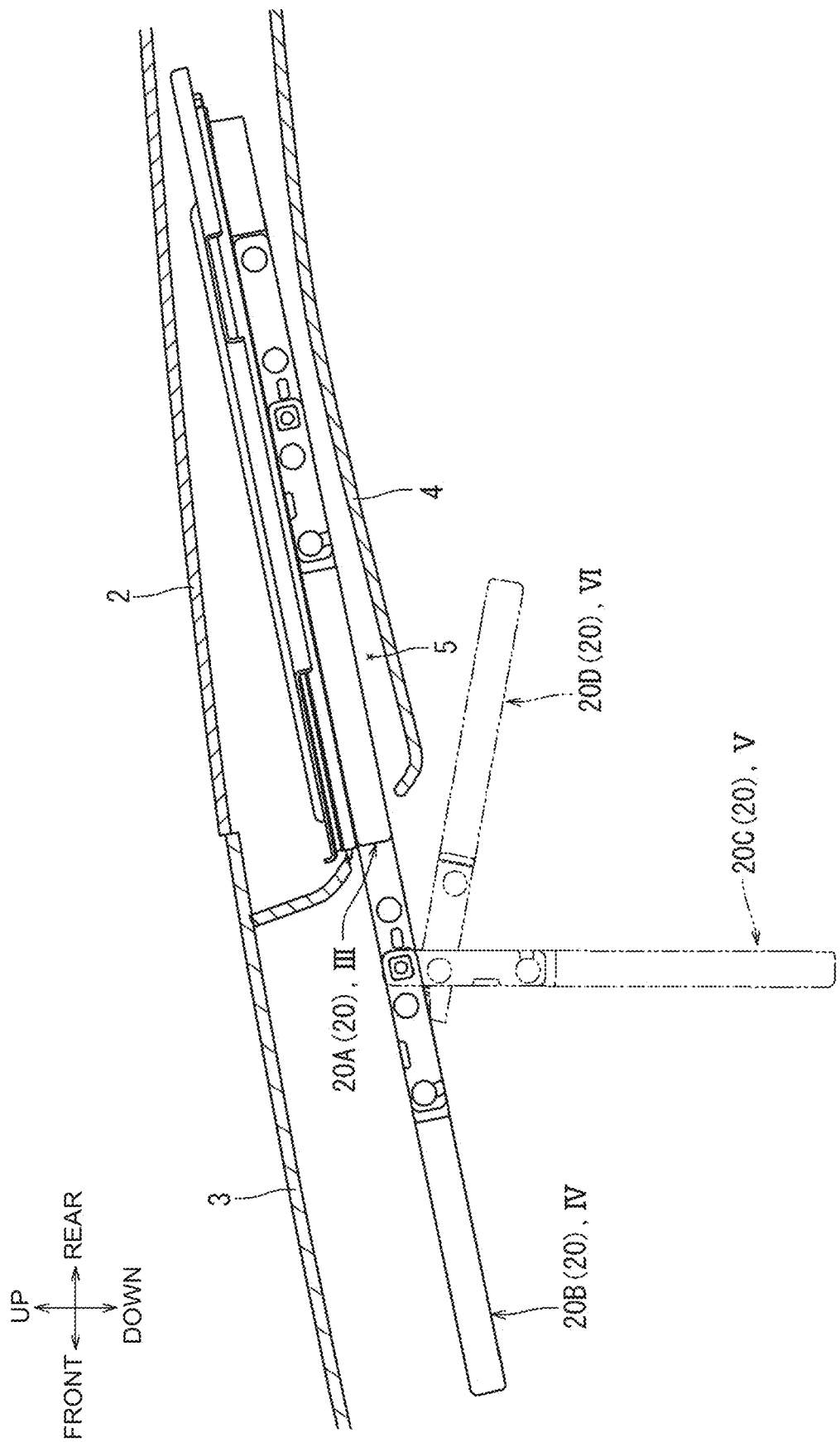
FIG. 1 is a sectional view illustrating an outline of a vehicle sun visor device according to the present embodiment.

As illustrated in FIG. 1, a roof panel 2 (a vehicle constituent component) made of steel sheet is provided as a roof of an automobile. A windshield 3 is disposed in front of the roof panel 2, and an automobile ceiling material 4 (a vehicle interior material) is provided inside an automobile cabin as an interior material. A housing space 5 is formed between the roof panel 2 (the vehicle constituent component) and the automobile ceiling material 4 (the vehicle interior material). Further, a windshield-3 side of the automobile ceiling material 4 is opened. The vehicle sun visor device in the embodiment is assembled along a surface of the automobile ceiling material 4 in the housing space 5 between the roof panel 2 and the automobile ceiling material 4.

Figure 2:
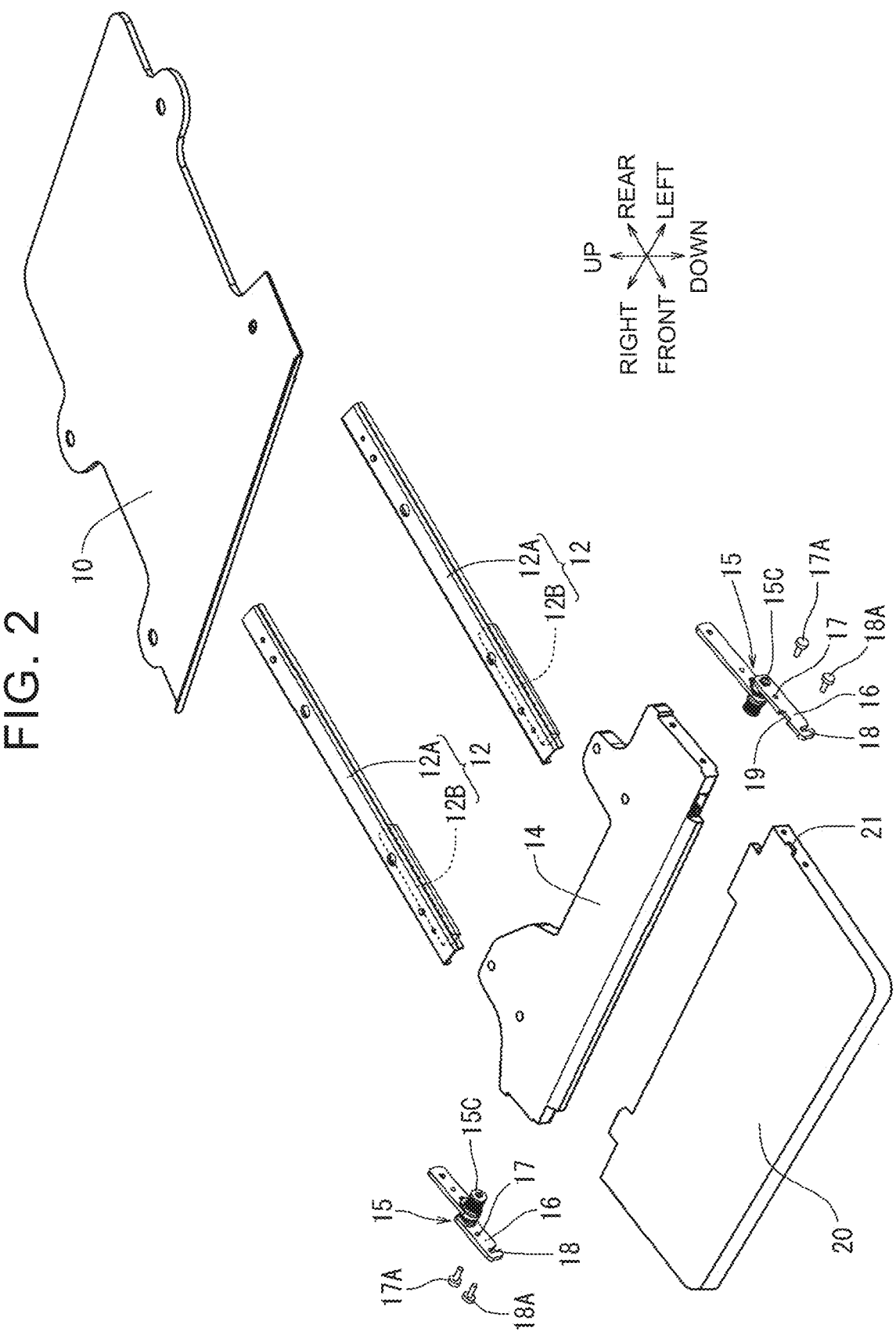
FIG. 2 is an exploded perspective view of the vehicle sun visor device.

As illustrated in FIG. 2, the vehicle sun visor device includes a base 10 (a support), slide rails 12, a sliding base 14 (a sliding body), torque hinges 15 (hinges), and a visor body 20.

The base 10 (the support) serves as a base for the vehicle sun visor device. The base 10 is a plate-shaped member and is fixed to the roof panel 2 or the automobile ceiling material 4. In the present embodiment, the base 10 is fixed along the roof panel 2.

A pair of right and left slide rails 12 is disposed on a bottom side of the base 10. The right and left slide rails 12 are disposed in parallel to each other. The slide rails 12 are elongated members extending in the automobile front-rear direction, and fixed rails 12A are fixed to the base 10. Movable rails 12B are fitted in the fixed rails 12A in a slidable manner in a rail longitudinal direction of the fixed rails 12A. The sliding base 14 (the sliding body) is connected to the movable rails 12B. Hereby, the sliding base 14 is supported reciprocatably relative to the base 10 in the front-rear direction.

The sliding base 14 (the sliding body) is a plate-shaped member that supports the visor body 20 via a pair of right and left torque hinges 15 (the hinges). The right and left torque hinges 15 are attached to a front end of the sliding base 14. The visor body 20 having a plate shape is attached to the front sides of the torque hinges 15.

The torque hinge 15 includes a connecting member 16 to which the visor body 20 is connected. The connecting member 16 is a member configured such that a band-shaped member linearly extends outwardly in the radial direction from a hinge shaft 15C serving as a rotating center. The connecting member 16 has a hole portion 17 at an intermediate position placed outwardly in the radial direction from the hinge shaft 15C. The visor body 20 is rotatably connected by a first fastening member 17A through the hole portion 17. Here, a configuration in which the visor body 20 is rotatably connected by the first fastening member 17A at the hole portion 17 corresponds to a "first connecting portion." Note that the fastening by the first fastening member 17A is described as the configuration of the "first connecting portion" in which the visor body 20 is connected to the connecting member 16. However, this is one aspect of the "first connecting portion." The "first connecting portion" may employ various connecting configurations, e.g., a form in which the visor body 20 is connected to the connecting member 16 by passing a pin through the hole portion 17, or a form in which the visor body 20 is connected to the connecting member 16 by passing a shaft-shaped clip through the hole portion 17, provided that the visor body 20 is connected to the connecting member 16 so as to be rotatable relative to the connecting member 16 around the hole portion 17 as a rotation center.

The connecting member 16 has a notch groove 18 at a position placed further outwardly from the hole portion 17 in the radial direction from the hinge shaft 15C. The notch groove 18 is cut in a direction where the connecting member 16 rotates around the hinge shaft 15C. The visor body 20 is connected by a second fastening member 18A through the notch groove 18. Here, a configuration in which the visor body 20 is connected to the connecting member 16 via the notch groove 18 corresponds to a "second connecting portion." Note that the fastening by the second fastening member 18A is described as connection between the visor body 20 and the connecting member 16. However, this is one aspect of the "second connecting portion." The "second connecting portion" may employ various connecting configurations, e.g., a form in which the visor body 20 is connected to the connecting member 16 by passing a pin through the notch groove 18, or a form in which the visor body 20 is connected to the connecting member 16 by passing a shaft-shaped clip through the notch groove 18.

The connecting member 16 includes a recessed portion 19 having a shape in which an edge is recessed. The recessed portion 19 is provided on an end surface (an end surface opposite to an end surface where the notch groove 18 is formed) opposite to a direction where the connecting member 16 rotates around the hinge shaft 15C. Further, the recessed portion 19 is provided between the hole portion 17 and the notch groove 18. The recessed portion 19 is formed with a size that allows a projecting portion 21 (described below) is fitted in the recessed portion 19.

The visor body 20 is a rectangular plate-shaped member. The visor body 20 includes the projecting portion 21 having a projecting shape projecting toward the connecting member 16. The projecting portion 21 has a function to maintain a rotation prevention state where the visor body 20 does not rotate around the hole portion 17 by engaging with the recessed portion 19 of the connecting member 16. Further, the projecting portion 21 is set to have a strength with which the projecting portion 21 does not break even when an operation load to rotate the visor body 20 around the hinge shaft 15C is applied to the visor body 20, but the projecting portion 21 breaks when a deployment load F (see FIGS. 5, 7) of an airbag is applied to the visor body 20. The strength of the projecting portion 21 can be changed depending on a distance from the hole portion 17, a sectional area, and so on. On that account, the strength of the projecting portion 21 can be set appropriately in accordance with a type of the deployment load F of the airbag.

Operation Content of Automobile Sun Visor Device: FIG. 1, FIGS. 3 to 8

Figure 3:
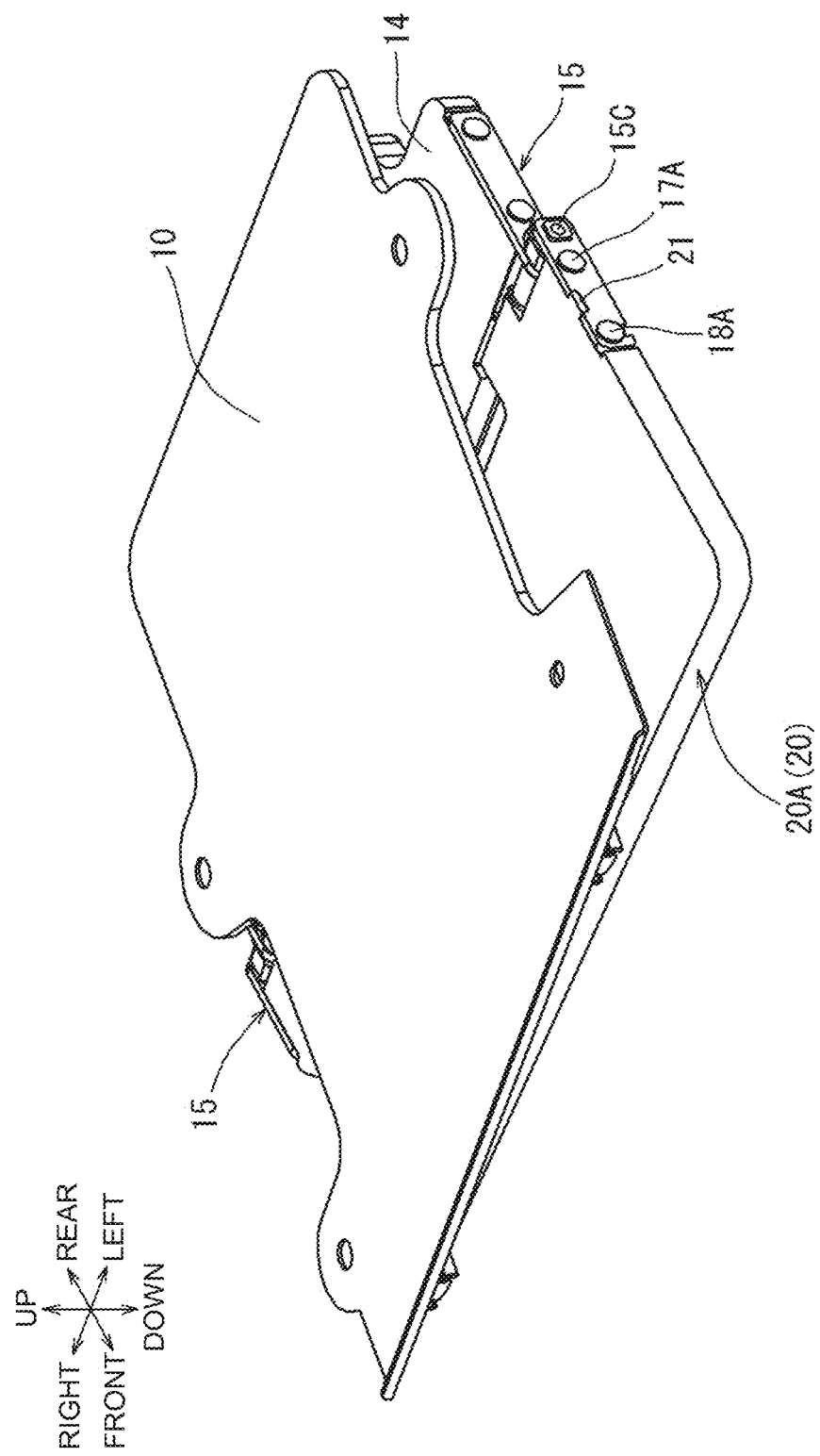
FIG. 3 is a perspective view illustrating a state where a visor body of the vehicle sun visor device is placed at a stored position at which the visor body is stored in a housing space.

As illustrated in FIGS. 1, 3, the visor body 20 is placed at a stored position 20A in which the visor body 20 is stored in the housing space 5 when the sliding base 14 (the sliding body) is placed on the rear side within a slide range of the slide rails 12. At this time, the visor body 20 is placed linearly to the sliding base 14 (the sliding body), so that the visor body 20 and the sliding base 14 are placed adjacently to each other in a plane manner.

Figure 4:
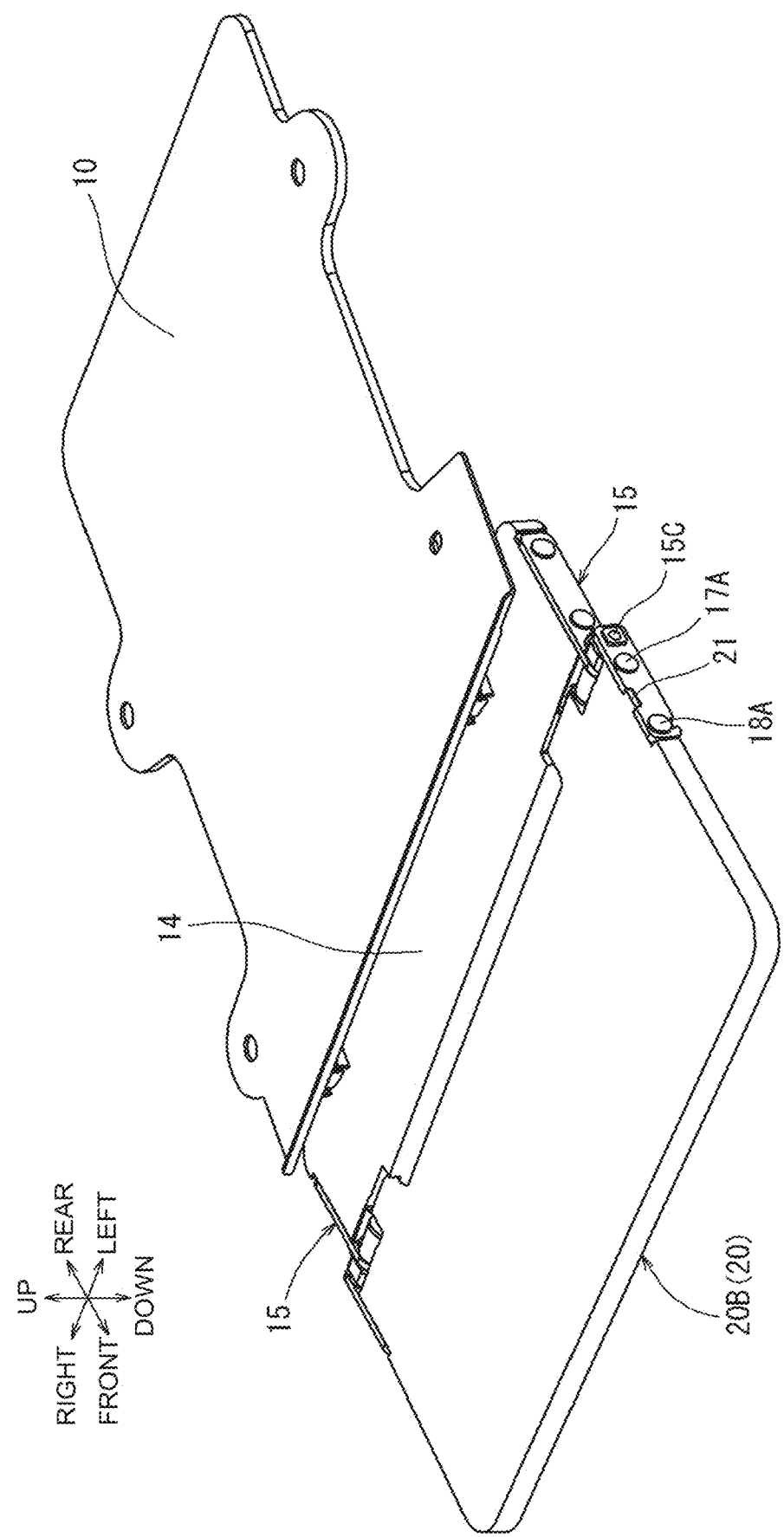
FIG. 4 is a perspective view illustrating a state where the visor body of the vehicle sun visor device is placed at a drawn position at which the visor body is exposed in a vehicle cabin.

As illustrated in FIGS. 1, 4, a position to which the visor body 20 is manually drawn forward from the stored position 20A (see FIG. 3) is a drawn position 20B where the visor body 20 is exposed to the automobile cabin. At this time, the visor body 20 has a posture along the windshield 3.

Figure 5:
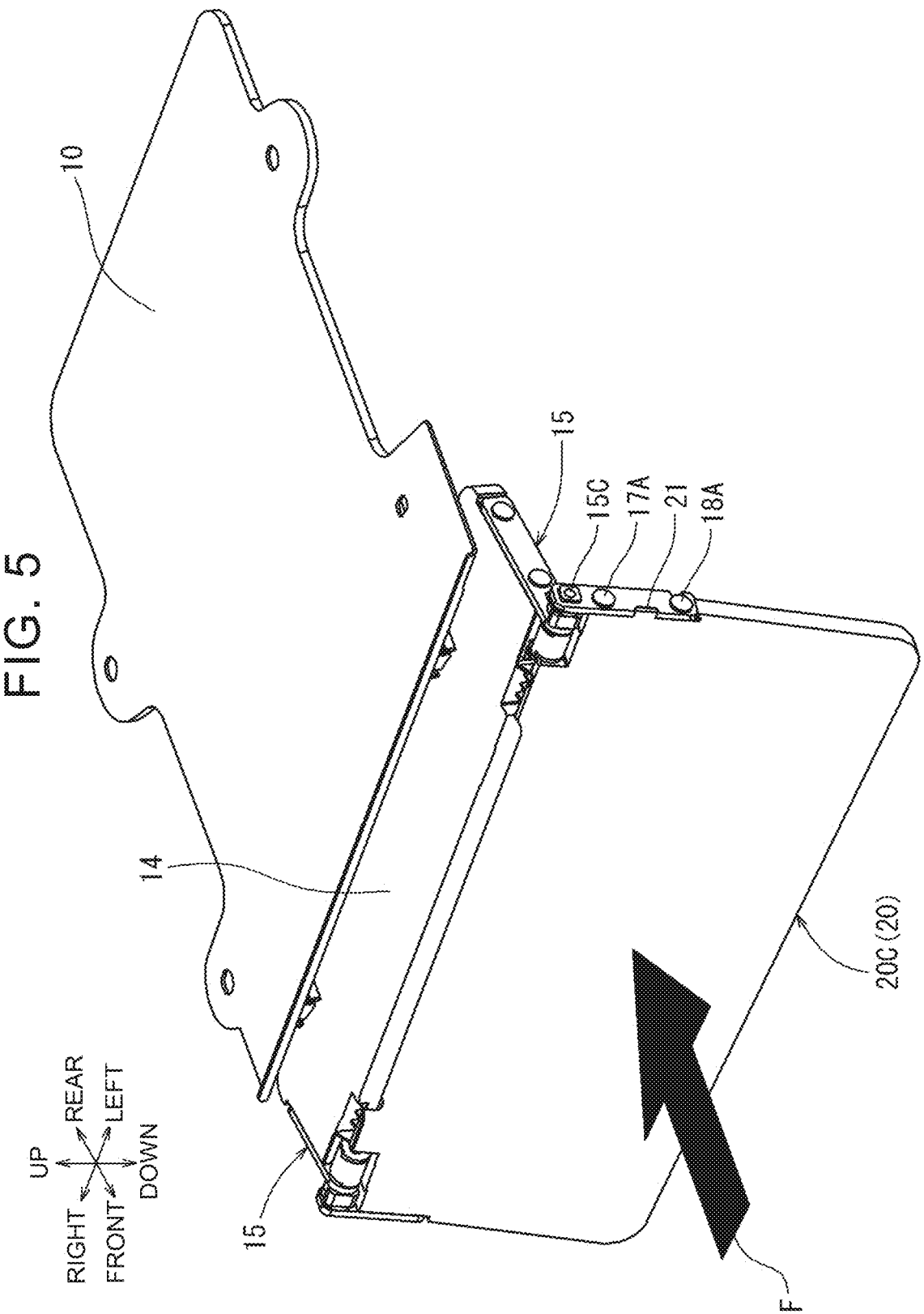
FIG. 5 is a perspective view illustrating a state where the visor body of the vehicle sun visor device is placed at a usage position.
Figure 7:
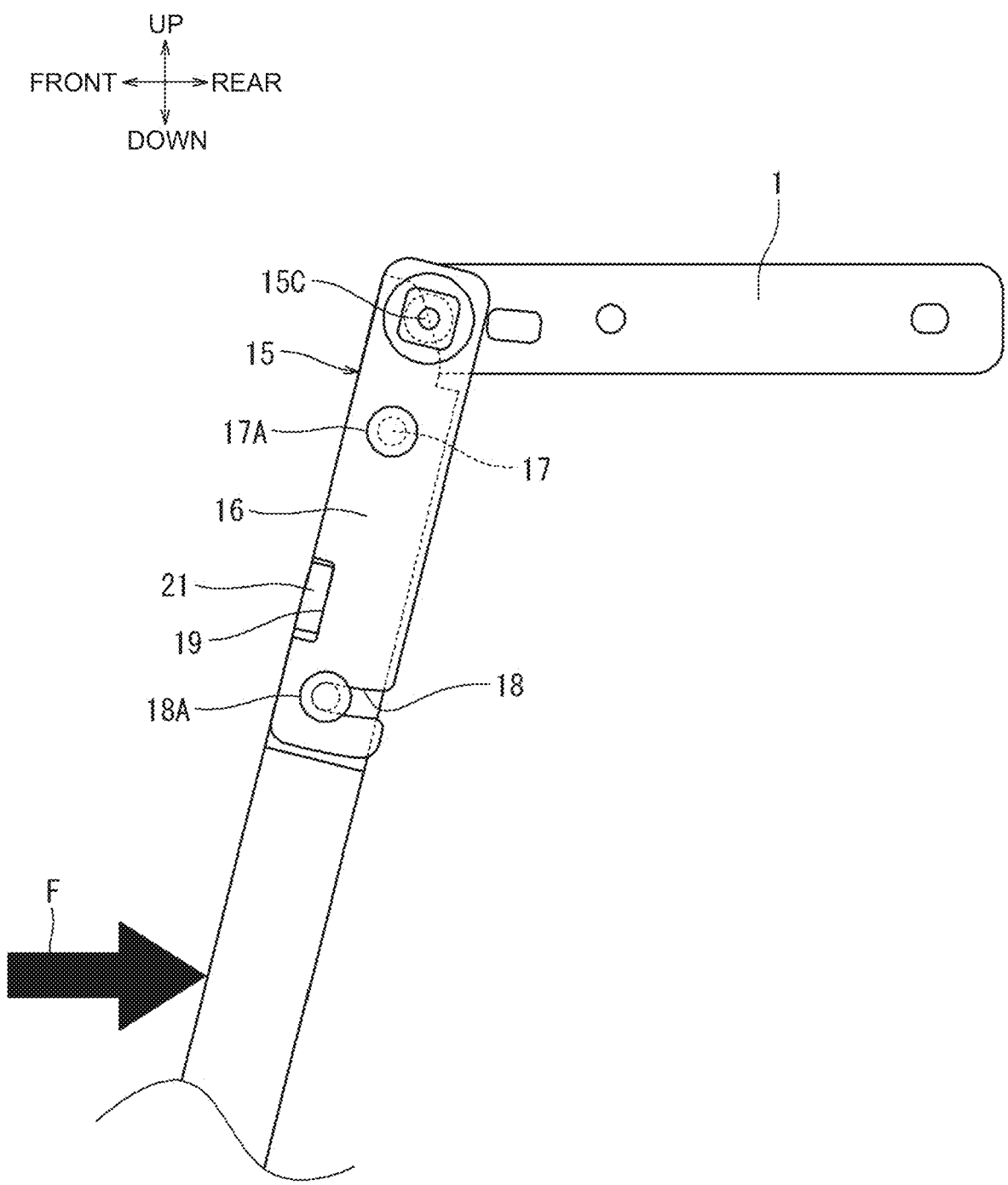
FIG. 7 is a side view illustrating, in an enlarged manner, a hinge in a state where the visor body of the vehicle sun visor device is placed at the usage position.

As illustrated in FIGS. 1, 5, 7, the visor body 20 at the drawn position 20B (see FIG. 4) is manually rotated so that a distal end of the visor body 20 faces rearward and downward. When the connecting member 16 of the torque hinge 15 rotates downward around the hinge shaft 15C, the visor body 20 can be set to a usage position 20C at which the visor body 20 is rotated at a given angle. Here, even when a normal operation load is applied to the visor body 20, the projecting portion 21 does not break. On this account, the rotation prevention state where the visor body 20 does not rotate around the hole portion 17 is maintained. However, when the deployment load F of the airbag is applied to the visor body 20 at the usage position 20C (see FIG. 5), the projecting portion 21 breaks.

Figure 6:
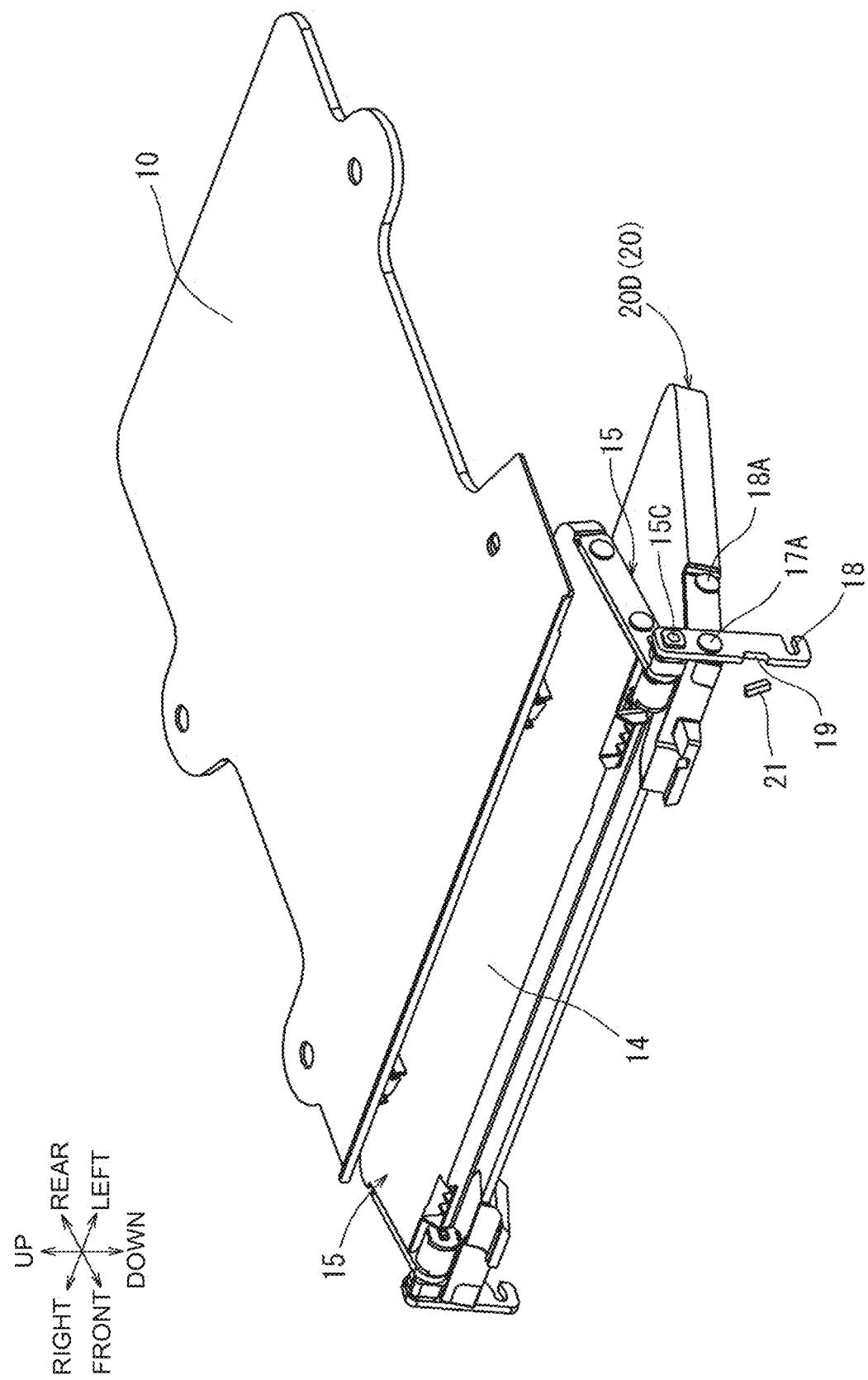
FIG. 6 is a perspective view illustrating a state where the visor body of the vehicle sun visor device is placed at a retraction position along a vehicle interior material.
Figure 8:
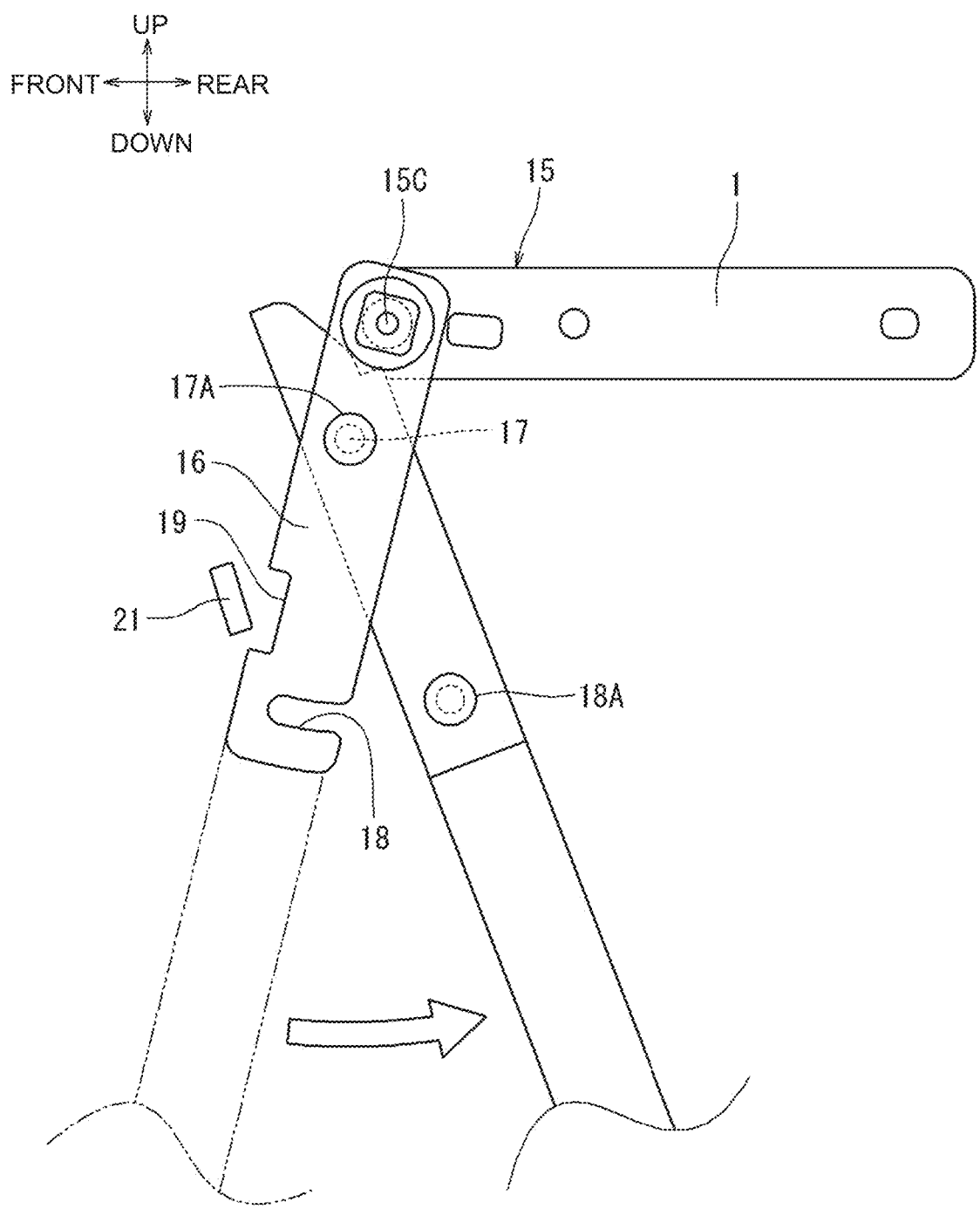
FIG. 8 is a side view illustrating, in an enlarged manner, the hinge in a state where the visor body of the vehicle sun visor device is placed at the retraction position.

As illustrated in FIGS. 1, 6, 8, when the deployment load F of the airbag is applied to the visor body 20 at the usage position 20C (see FIG. 5), the projecting portion 21 breaks. Then, the visor body 20 rotates around the hole portion 17, and the distal end of the visor body 20 retreats rearward and upward. At this time, the second fastening member 18A is removed from the notch groove 18. Hereby, the visor body 20 is placed at a retraction position 20D along the automobile ceiling material 4.

As such, with the automobile sun visor device of the present embodiment, the torque hinge 15 (the hinge) includes the connecting member 16 to which the visor body 20 is connected, and the connecting member 16 extends outwardly in the radial direction from the hinge shaft 15C as the rotating center. The connecting member 16 includes the hole portion 17 and the first fastening member 17A as the first connecting portion configured to rotatably connect the visor body 20 at the position placed outwardly in the radial direction from the hinge shaft 15C. The visor body 20 includes the projecting portion 21 configured to maintain the rotation prevention state where the visor body 20 does not rotate around the hole portion 17 when the projecting shape projecting toward the connecting member 16 engages with the connecting member 16. The projecting portion 21 is set to have a strength with which the projecting portion 21 does not break even when the operation load to rotate the visor body 20 around the hinge shaft 15C is applied to the visor body 20, but the projecting portion 21 breaks when the deployment load F of the airbag is applied to the visor body 20. On this account, the visor body 20 has a structure in which, when the deployment load F of the airbag is applied to the visor body 20, the projecting portion 21 breaks, so that the visor body 20 further rotates around the hole portion 17. This allows the visor body 20 to retreat when the airbag deploys. Hereby, it is possible to achieve a structure of the vehicle sun visor device that does not prevent deployment of the airbag at the time when the airbag deploys, without disturbing a normal use operation of the visor body 20.

Further, the second connecting portion by which the visor body 20 is connected to the connecting member 16 via the notch groove 18 is provided at a position different from the hole portion 17. On this account, the visor body 20 can be connected to the connecting member 16 in a two-point support manner at a part where the hole portion 17 is provided and at a part where the notch groove 18 is provided. Further, the second fastening member 18A can be removed from the connecting member 16 via the notch groove 18, thereby making it possible to achieve a structure that does not disturb the visor body 20 when the projecting portion 21 breaks and the visor body 20 further rotates around the hole portion 17 at the time when the deployment load F of the airbag is applied to the visor body 20.

The embodiment of the disclosure has been described above, but the disclosure is not limited to the above embodiment and is performable in various embodiments other than the above embodiment. For example, the vehicle is not limited to an automobile and is applicable to various vehicles such as a vessel and an aircraft.

What is claimed is:
1. A vehicle sun visor device comprising:
   a support disposed in a housing space between a vehicle constituent component of a vehicle and a vehicle interior material disposed inside a vehicle cabin;
   a sliding body supported reciprocatably relative to the support in a front-rear direction;
   a visor body connected to the sliding body; and
   a hinge configured to connect the visor body to the sliding body in a rotatable manner in an up-down direction, wherein:
   the hinge includes a connecting member to which the visor body is connected, the hinge extending outwardly in a radial direction from a hinge shaft as a rotating center;

the connecting member includes a first connecting portion configured to rotatably connect the visor body at a position placed outwardly in the radial direction from the hinge shaft;

the visor body includes a projecting portion configured to maintain a rotation prevention state where the visor body does not rotate around the first connecting portion when a projecting shape projecting toward the connecting member engages with the connecting member; and the projecting portion is set to have a strength with which the projecting portion does not break even when an operation load to rotate the visor body around the hinge shaft is applied to the visor body, but the projecting portion breaks when a deployment load of an airbag is applied to the visor body.

2. The vehicle sun visor device according to claim 1, wherein:

the connecting member includes a notch groove provided at a position placed further outwardly from the first connecting portion in the radial direction from the hinge shaft, the notch groove being cut in a direction where the connecting member rotates around the hinge shaft; and the connecting member includes a second connecting portion in which the visor body is connected to the connecting member via the notch groove.

* * * * *